United States Patent [19]

Wysocki

[11] 3,876,568

[45] Apr. 8, 1975

[54] LOW SMOKE OUTPUT POLYISOCYANURATE-URETHANE FOAMS CONTAINING SULFUR

[75] Inventor: Donald C. Wysocki, Newark, Ohio

[73] Assignee: Owens-Corning Fiberglas Corporation, Toledo, Ohio

[22] Filed: June 18, 1973

[21] Appl. No.: 371,324

[52] U.S. Cl. ..... 260/2.5 AW; 260/2.5 AJ; 260/37 N
[51] Int. Cl. ..................... C08g 22/46; C08g 51/10
[58] Field of Search ....... 260/2.5 AJ, 2.5 AW, 37 N

[56] References Cited
UNITED STATES PATENTS

| 3,542,701 | 11/1970 | van Raamsdonk | 260/2.5 |
| 3,625,872 | 12/1971 | Ashida | 260/2.5 |
| 3,725,319 | 4/1973 | Frisch | 260/2.5 |
| 3,763,057 | 10/1973 | Diehr | 260/2.5 |

FOREIGN PATENTS OR APPLICATIONS

| 1,499,352 | 9/1966 | France | 260/2.5 |

*Primary Examiner*—Eugene C. Rzucidlo
*Attorney, Agent, or Firm*—Carl G. Staelin; John W. Overman; Patrick P. Pacella

[57] ABSTRACT

Polyisocyanurate-urethane foams are disclosed. Low smoke output is achieved by the addition of elementary sulfur.

2 Claims, No Drawings

LOW SMOKE OUTPUT POLYISOCYANURATE-URETHANE FOAMS CONTAINING SULFUR

This invention relates to polyisocyanurate-urethane foams.

Plastic foams such as polyurethane foams and polyisocyanurate-urethane foams have found widespread utility in the fields of insulation and structural reinforcement. One factor limiting the commercial utilization of plastic foams has been their flammability when exposed to flame or high temperature. Another factor to be considered is the amount of smoke generated by the foams under fire conditions. Modifications to control these properties are known in the art. For example, U.S. Pat. No. 3,542,701 discloses the use of elementary sulfur as a flame-retardant in some plastic foams. U.S. Pat. No. 3,725,319 discloses that the amount of smoke generated under fire conditions by isocyanurate-urethane materials is substantially reduced by the addition to these materials of an alkali metal fluoroborate or ammonium fluoroborate or combination thereof.

It now has been found that elementary sulfur can be added to polyisocyanurate-urethane foams to lower smoke output.

Accordingly, an object of this invention is to provide polyisocyanurate-urethane foams.

Other objects, aspects and advantages of this invention will be apparent to one skilled in the art from the following disclosure and appended claims.

The amount of elementary sulfur in the polyisocyanurate-urethane foam ranges from 3 to 20 percent by weight, preferably 5 to 15 percent by weight.

As used herein the term "isocyanurate" or "polyisocyanurate" refers to a composition having isocyanurate rings in its structure; these rings are generally depicted as:

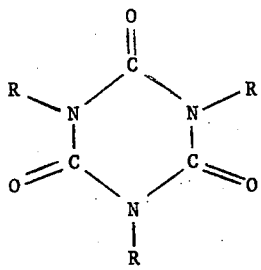

and are believed to be produced in accordance with the following representative equation:

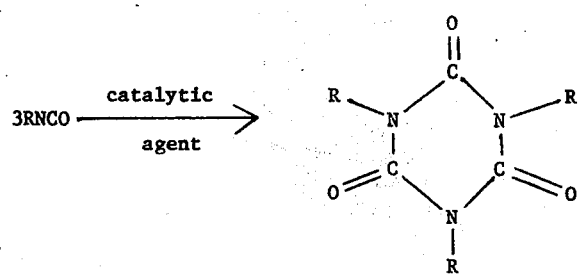

It is known in the art that the trimerization or polymerization of organic isocyanates having the formula RNCO, urethane prepolymers having reactive —NCO groups, or other materials having reactive —NCO groups attached thereto, for example, polyamide prepolymers, or combinations of these compounds, in the presence of a suitable catalytic agent and preferably one or more polyols will yield polymers referred to as isocyanurates, isocyanurate-urethanes or, for example, isocyanurate-amides or isocyanurate-urethane-amides. In all of these compounds the above described isocyanurate ring structure is present.

Urethanes or polyurethanes can be formed by a variety of methods, although the most widely used production method is the reaction of di- or polyfunctional hydroxyl compounds, for example, hydroxyl-terminated polyesters or polyethers, with di- or polyfunctional isocyanates. The general structure of a linear polyurethane derived from a dihydroxy compound, HOROH, and a diisocyanate, OCNR'NCO, can be represented by the following general formula:

$$(-R-O-\overset{O}{\underset{\|}{C}}-NH-R'-NH-\overset{O}{\underset{\|}{C}}-O-)_n.$$

In the isocyanurate-urethane (polyisocyanurate-polyurethane) compositions disclosed herein there is a combination of isocyanurate and urethane linkages or structure. Of the total isocyanate used in these compositions some of it is trimerized or polymerized to form isocyanurate rings and some of it is reacted with one or more polyols to form urethane linkages. These compositions are formed by controlling the NCO/OH ratio of the isocyanate and polyol reactants so that a certain percentage of the total available isocyanate can react with the polyol to form urethane structure and the remainder of the isocyanate can trimerize to form isocyanurate structure. Generally, the NCO/OH ratio is maintained between about 4 to 1 and 50 to 1 and the isocyanurate-urethane plastic foams so produced are about 5 to 25% urethane and 75 to 95% isocyanurate. The NCO/OH index is determined by using the formula:

NCO/OH index =

<u>hydroxyl equivalent of isocyanate x weight of isocyanate used</u>
hydroxyl number of polyol x weight of polyol used Suitable isocyanates or reactive —NCO containing compounds which may be employed in practicing the invention include: 2,4-tolylene diisocyanate; 2,6-tolylene diisocyanates; p-phenylene diisocyanate; polymethylene polyphenylisocyanate; diphenyl-methane diisocyanate; m-phenylene diisocyanate; hexamethylene diisocyanate; butylene-1,4-diisocyanate; octamethylene diisocyanate; 3,3'-dimethoxy-4,4'-biphenylene diisocyanate; 1,18-octadecamethylene diisocyanate; polymethylene diisocyanate; benzene triisocyanate; naphthylene-2,4-diisocyanate, 3,3'-dimethyl-4,4'-biphenylene diisocyanate; 1-methoxy phenylene-2,4-diisocyanate; diphenylene-4,4'-disocyanate, 4,4'-diisocyanato diphenyl ether; naphthylene-1,5-diisocyanate; diisocyanato-dicyclohexyl-methane; p-xylylene diisocyanate; xylylene diisocyanate; hydrogenated diphenylene diisocyanate; hydrogenated diphenyl methane diisocyanate; toluene-2,4,6- triisocyanate; 3-methyl-4,6,4'-triisocyanate diphenylmethane; 2,4,4'-triisocyanato diphenyl;2,4,4'-triisocyanato diphenyl ether; long chain hydrocarbons and substituted hydrocarbons terminated with —NCO radicals and mixtures thereof. Prepolymers having reactive isocyanate or —NCO groups may also be used.

Suitable polyols (hydroxy terminated or polyhydric compounds) which may be reacted with the isocyanate or —NCO containing compounds include by way of example: polyalkylene ether glycols, triols and so forth having up to 8 hydroxyl groups, and the polyhydric polyesters obtained by the reaction of a dicarboxylic acid with one or more polyhydric alcohols such as diol, triol, tetrol to produce a hydroxy terminated polyester. Examples of polyhydric compounds include branched chain polyols of hydroxyl terminated condensation products of propylene oxide or of mixed ethylene and propylene oxides or other alkylene oxides with polyhydric alcohols of 2 to 8 hydroxyl groups such as with ethylene glycol, glycerol, 1,3,6-hexanetriol, pentaerythritol, sorbitol, sucrose, and methyl glucoside, or with diamines, and triamines; linear polyols such as dipropylene glycol, tripropylene glycol, polypropylene ether glycol, polyisopropylene ether glycol, polyethylene propylene ether glycol, polyethylene ether glycol, polyhexamethylene ether glycol, polytetramethylene ether glycol and liquid hydroxy terminated polyesters formed by reaction of a dicarboxylic acid such as adipic or sebacic acid or their anhydrides with one or more of the above glycols or with a small amount of a higher polyol, e.g. hexanetriol, or pentaerythritol to give such branching. Small amounts of amines or amino alcohols can also be used in making polyesters. Mixtures of these polyols can be used also.

Rigid, low density foams can be prepared by reacting the polyols of this invention with the polyisocyanates in the presence of a suitable catalyst, a blowing agent, and generally a surfactant. This invention works well for both the one-shot technique and the pre-polymer approach.

The foaming operation is effected by means of incorporating the blowing agent in the foam forming constituents. It can be water or a low boiling, inert liquid, which vaporizes below the temperature of the foaming mass. The preferred blowing agents are certain halongen-substituted aliphatic hydrocarbons. In foams intended for use as insulation the incorporation of a gas lowers the foam's heat conductivity and results in obtaining a better K-factor. All of these methods are known in the art.

Preferred blowing agents are fluorocarbons such as trichloromonofluoromethane, dichlorofluoromethane and the like. The weight of blowing agents used is varied depending on the foam density desired.

Catalysts which are conventional for the trimerization of isocyanate groups may be used in the present invention. Some examples are described in the literature, such as Saunders, J. R. and Frisch, K. C. "Polyurethanes, Chemistry and Technology," Part 1, pgs, 94-97, and 212 Beitchmann, B. D. Rubber Age, February 1966, Beitchmann, B. D. I&EC Product Research and Development, Vol. 5, No. 1, pgs. 35-41, Mar. 1966, and Nicolas, L. and Gmitter, G. T., J. Cellular Plastics, Vol. 1, No. 1, pgs. 85-95 (1965).

Examples of catalysts are (a) organic strong bases or salts thereof, (b) tertiary amine cocatalyst combinations, (c) Friedal Crafts Catalysts, (d) basic salts or organic weak acids, (e) alkali metal oxides, alkali metal alcoholates, alkali metal phenolates, alkali metal hydroxides and alkali metal carbonates, (f) onium compounds from nitrogen, phosphorous, ananic, antimony, sulfur and selenium, (g) epoxides and (h) nonsubstituted monocarbamic esters. Preferred catalysts are those which are soluble in other components of the formulation including for example, polyether polyols and fluorocarbons.

Examples of organic strong bases are trialkyl phosphines trialkylaminoalkyl phenols and 3-and/or 4-substituted pyridine.

Some examples of the tertiary amine-cocatalyst combinations are triethylene diamine-propylene oxide, triethylene diamine-trioxymethylene. N,N,N,N' tetramethyl 1,3-butane diamine-propylene oxide, pyridine-propylene oxide, N-methyl morpholine-propylene oxide, triethylene diamine-acetal-dehyde, triethylene diamine-alkyleneimine.

Examples of Friedel Crafts catalysts include $AlCl_3$, $FeCl_3$, $BF_3$ and $ZnCl_2$.

Examples of salts of organic weak acids includes (A) alkali metal salts of mono- or dicarboxylic acids of aliphatic, aromatic, alicyclic or aralkyl acids which are described in British Pat. No. 809,809 and also (B) alkali metal salts of organic weak acids excluding carboxylic acids, for example, salts of benzosulfinic acid, nitrophenols, picric acid, phthalimide, and diethyl phosphite.

Preferred salts for use in the present invention are alkali metal salts of $C_8$–$C_{30}$ carboxylic acids, especially potassium salts of such carboxylic acids, such as for example potassium oxtoate or 2-ethyl hexoate, potassium benzoate and potassium oleate.

Potassium salts are the most effective alkali metal salts. The activity decreases in the order of potassium, sodium and lithium. Rubidium and cesium salts may also be used. Examples of common alkali metal oxides are potassium oxide, sodium oxide and lithium oxide. Examples of alkali metal alcoholates are sodium methoxide, potassium ethoxide, and potassium alcoholates formed from ethylene glycol or a polyether polyol.

Examples of alkali phenolates are sodium phenolate, sodium 2,4-dinitrophenolate, potassium 2,4,6-trinitrophenolate, sodium 2,4,6-trichlorophenolate and potassium 2,4-dichlorophenolate.

Examples of alkali metal hydroxides and carbonates are hydroxides and carbonates of lithium, sodium, potassium, rebidium, and cesium respectively.

Examples of onium compounds from nitrogen, phosphorous, arsenic, antimony, sulfur, and slenium are described in British Pat. No. 837,120, for example tetraethyl ammonium hydroxide, benzyltriethylammonium hydroxide, tetrathylphosphonium hydroxide.

Examples of epoxides are described in J. Cellular Plastics, Vol. 1, No. 1, pg. 85, 1965.

Examples of monosubstituted monocarbamic ester are described in British Pat. No. 920,080.

The catalysts hereinbefore described are usually used in a state of solution or dispersion. Suitable solvents include water, dimethyl formamide, dimethyl sulfoxide and similar solvents. Polyether polyol or polyester may be also used as a solvent or a dispersion medium in the present invention.

When producing urethane foams it is useful in many cases to use a surfactant which serves to regulate rigid foam cell size. The surfactant most frequently used are high molecular weight, liquid silicones. The weight of surfactant used is generally between 0.5% and 1.5% by weight of the polyol.

Generally, the polyol, catalyst, blowing agent and surfactant are admixed. The isocyanate and sulfur are mixed and then added to the polyol mixture. If desired, the isocyanate and sulfur can be added to the polyol mixture separately with the sulfur being added last.

The advantages of this invention further are illustrated by the following examples. The reactants, proportions and other specific conditions are presented as being typical and should not be construed to limit the invention unduly.

EXAMPLE I

| Ingredients | Parts by Weight | | |
|---|---|---|---|
| | Run 1 | Run 2 | Run 3 |
| Isocyanate-polyphenyl polymethylene polyisocyanate | 100 | 100 | 100 |
| Polyol-reaction product of 1 mol of a polyoxypropylene derivative of trimethylolpropane, 1 mol of chlorendic anhydride and 2.5 mols of propylene oxide | 30 | 30 | 30 |
| Surfactant-silicone glycol copolymers with direct silicone carbon bonds | 2 | 2 | 2 |
| Blowing Agent - trichlorofluoromethane | 30 | 30 | 30 |
| Potassium fluoroborate | 15 | 15 | 15 |
| Trimerization Catalyst - dialkylaminomethyl phenol | 20 | 18 | 18 |
| sulfur elementary | — | 5 | 10 |
| Small Tunnel Smoke Density | 135 | 115 | 55 |

EXAMPLE II

| Ingredients | Parts by Weight | |
|---|---|---|
| | Run 4 | Run 5 |
| Prepolymer-polyphenyl polymethylene polyisocyanate and a neutral phosphorous polyol | 118 | 118 |
| Surfactant-silicone glycol copolymers with direct silicone carbon bonds | 1 | 1 |
| Trimerization Catalyst - dialkylaminomethyl phenol | 10 | 10 |
| Blowing agent - trichlorofluoromethane | 20 | 20 |
| Sulfur, elementary | — | 10 |
| Density, pcf | 2.4 | 2.3 |
| ASTM E-84 Tunnel Smoke Output | 150 | 65 | will reduce the amount of smoke generated by isocyanurate-urethane compounds.

EXAMPLE III

The runs of Example III were carried out according to the procedures of Example I except that an isocyanate prepolymer was employed. The prepolymer contained about 5 weight percent polyol. The comparative data of these runs show that additions of elementary sulfur will reduce the amount of smoke generated by isocyanurate-urethane compounds.

| Ingredients | Parts by Weight | | | | |
|---|---|---|---|---|---|
| | Run 6 | Run 7 | Run 8 | Run 9 | Run 10 |
| Prepolymer-polyphenyl polymethylene polyisocyanate and tetrabromophthalic anhydride based polyol | 110 | 110 | 110 | 110 | 110 |
| Trimerization Catalyst - dialkylaminomethyl phenol | 8 | 8 | 8 | 8 | 8 |
| Surfactant-silicone glycol copolymers with direct silicone carbon bonds | 1 | 1 | 1 | 1 | 1 |
| Blowing Agent - trichlorofluoromethane | 23 | 23 | 23 | 23 | 23 |
| Sulfur, elementary | — | — | 12 | 12 | 12 |
| Density, pcf | 1.9 | 1.9 | 2.1 | 2.2 | 2.2 |
| ASTM E-84 Tunnel Smoke Output | 85 | 130 | 35 | 25 | 25 |

Foam Runs 1, 2 and 3 were prepared by a one-shot method comprising adding the surfactant, catalyst and the blowing agent to the polyol, and then adding to this mixture the isocyanate followed by the sulfur. The mixture was stirred until creaming commenced and then quickly poured into a mold and allowed to rise. Each sample was cured at room temperature for at least two weeks prior to testing.

In the above Runs, substantially identical isocyanurate-urethane compositions are compared; the only significant difference between the samples being the inclusion of elementary sulfur in Runs 2 and 3. The comparative data of these runs shows that additions of elementary sulfur will reduce the amount of smoke generated by isocyanurate-urethane compounds.

The runs of Example II were carried out according to the procedures of Example I except that an isocyanate prepolymer was employed. The prepolymer contained about 10 weight percent polyol. The comparative data of these runs shows that additions of elementary sulfur Although this invention has been described in considerable detail, it must be understood that such detail is for the purposes of illustration only and that many variations and modifications can be made by one skilled in the art without departing from the scope and spirit thereof.

I claim:

1. A low smoke output, isocyanurate-urethane foam composition formed by reacting, in an NCO/OH ratio of from 4/1 to 50, one or more compounds having reactive —NCO groups with one or more polyols having reactive —OH groups; the isocyanurate-urethane composition containing, by weight, 5 to 15 percent, based on the total weight of the foam composition, of elementary sulfur, wherein the isocyanurateurethane composition is about 5 to 25%, by weight, urethane and about 75 to 95%, by weight, isocyanurate.

2. A composition according to claim 1 wherein the percent, by weight, of elementary sulfur is 10 or 12.

* * * * *